United States Patent [19]

Kimoto et al.

[11] 4,414,338

[45] Nov. 8, 1983

[54] CATION EXCHANGE MEMBRANE

[75] Inventors: Kyoji Kimoto, Yokohama; Hirotsugu Miyauchi, Tokyo, both of Japan

[73] Assignee: Asahi Kasei Kogyo Kabushiki Kaisha, Osaka, Japan

[21] Appl. No.: 279,156

[22] Filed: Jun. 30, 1981

Related U.S. Application Data

[63] Continuation of Ser. No. 52,604, Jun. 27, 1979, abandoned.

[51] Int. Cl.³ .............................................. B01J 39/20
[52] U.S. Cl. ......................................... 521/27; 521/28
[58] Field of Search .................................... 521/27, 28

[56]     References Cited
U.S. PATENT DOCUMENTS 4,085,071  4/1978  Resnick et al. ..................... 521/27
4,151,053  4/1979  Seko et al. ........................ 521/27

4,176,215  11/1979  Molner et al. ..................... 521/27

FOREIGN PATENT DOCUMENTS 2040803  3/1980  United Kingdom ................. 521/27

*Primary Examiner*—Joseph L. Schofer
*Assistant Examiner*—Peter F. Kulkosky
*Attorney, Agent, or Firm*—Birch, Stewart, Kolasch & Birch

[57]     ABSTRACT

A cation exchange membrane prepared from a blend of two different fluorinated polymers, each containing cation exchange groups selected from carboxylic acid groups, sulfonamide groups, N-monosubstituted sulfonamide groups and sulfonic acid groups, having different exchange capacities with a difference of at least 200 therebetween in terms of equivalent weight. This membrane has been found to be useful in the electrolysis of an aqueous alkali metal halide solution and can give improved results in such an electrolysis.

9 Claims, No Drawings

CATION EXCHANGE MEMBRANE

This application is a continuation, of copending application Ser. No. 52,604, filed on June 27, 1979 abandoned.

This invention relates to an improved cation exchange membrane to be used for electrolysis of an aqueous alkali metal halide solution. More particularly, this invention relates to a fluorocarbon type cation exchange membrane which is constituted of blended polymers of two kinds of polymers differing by 200 or more in equivalent weight as defined below and having cation exchange groups selected from the group consisting of carboxylic acid groups, sulfonamide groups, N-sulfonamide groups and sulfonic acid groups.

In the present invention, the term "equivalent weight" is defined as "grams of dry resin containing one equivalent of exchange group in the H form".

It is known in the art to use a cation exchange membrane comprising a perfluorocarbon polymer having pendant sulfonic acid groups, which is prepared by saponifying a membrane of a copolymer of tetrafluoroethylene and perfluoro-3,6-dioxa-4-methyl-7-octenesulfonyl fluoride, for electrolysis of an aqueous alkali metal halide solution. However, due to the highly hydrophilic nature of the sulfonic acid groups, such a perfluorocarbon type cation exchange membrane of the prior art readily permits hydroxyl ions back migrated from the cathode chamber to permeate therethrough. This phenomenon results disadvantageously in lower current efficiency at the time of electrolysis. In particular, when electrolysis is carried out while recovering a caustic soda solution with a high concentration of 20% or more, the current efficiency becomes extremely low resulting in a great economical disadvantage, as compared with the conventional electrolysis of sodium chloride by the mercury process or by the diaphragm process. For improvement of such a low current efficiency, the exchange capacity of the sulfonic acid groups may be lowered, for example, to 0.7 milliequivalent or lower per one gram of H-form dry resin. As a result, the water content in the membrane can be decreased to enhance relatively the concentration of ions bound in the membrane as compared with a membrane having a higher exchange capacity, whereby the current efficiency can slightly be prevented from being lowered at the time of electrolysis. In the production of caustic soda with a concentration of 20% or higher by the electrolysis of sodium chloride, for example, the current efficiency can be improved by as much as about 80%. A decrease in the exchange capacity of the membrane for improvement of current efficiency, however, leads to a noticeable increase in the electric resistance of the membrane, whereby it is not possible to provide an electrolysis economically. Moreover, even at any high electric resistance of the membrane, it is hardly possible to prepare a commercial cation exchange membrane of the perfluorosulfonic acid type which is improved in current efficiency to a value of about 90%.

U.S. Pat. Nos. 3,784,399, 4,085,071 and 3,969,285 disclose fluorocarbon cation exchange membranes having sulfonic acid groups which are provided in the surface layer facing the cathode with sulfonamide groups or N-monosubstituted sulfonamide groups. These membranes, however, fail to provide sufficient beneficial electrochemical properties.

There has already been proposed a cation exchange membrane comprising a fluorocarbon polymer containing pendant carboxylic acid groups of the formula $-OCF_2COOM$, preferably in the surface layer facing the cathode, as is disclosed by British Pat. No. 1,523,047. These cation exchange membranes have excellent electrochemical properties and chemical stability. When they are used as diaphragms for electrolysis of aqueous sodium chloride solutions, high current efficiencies can be attained with a smaller power consumption. However, while these membranes having carboxylic acid groups can exhibit a high current efficiency and stable low voltage at practical alkali concentrations, they can suffer from a lowering of current efficiency to some extent and an elevation of voltage at further increased concentrations. Thus, depending on the various different restrictions or installation conditions including operation conditions employed, these membranes may sometimes fail to be economically optimum.

An object of the present invention is to provide an improved cation exchange membrane which can exhibit a higher current efficiency and stable low voltage even at further increased alkali concentrations.

According to the present invention, there is provided a fluorocarbon type cation exchange membrane comprising fluorinated polymers having at least one kind of cation exchange groups selected from the group consisting of carboxylic acid groups, sulfonamide groups, N-monosubstituted sulfonamide groups and sulfonic acid groups as side chains or as a part of side chains bonded to the backbone of the fluorinated polymers, wherein the improvement comprises constituting said membrane by the use of a composition which is a homogeneous blend of two different fluorinated polymers having different cation exchange capacities. This blend is constituted as follows:

(1) a first fluorinated polymer having a cation exchange capacity which is in the range of from 1350 to 1900 in terms of equivalent weight;

(2) a second fluorinated polymer having a cation exchange capacity which is smaller by at least 200 than that of said first fluorinated polymer and which is in the range of from 900 to 1300; and (3) both polymers being blended at weight ratios so as to give an average equivalent weight in the range of from 1100 to 1600 to said composition.

The specific feature of the cation exchange membrane provided by the present invention resides in the specific composition of blended polymers which is prepared by blending said two kinds of polymers differing in equivalent weight by 200 or more. It is known to the art to alleviate variances between batches of polymerization and to equalize the quality of membranes by blending two or more kinds of polymers with substantially the same equivalent weight before molding into membranes. However, in the present invention, two kinds of polymers differing by 200 or more in equivalent weight are blended to give unexpected results as hereinafter described.

With the increase in equivalent weight, the membrane generally tends to be increased in mechanical strength as well as swelling resistance with the result that the current efficiency can be maintained in a stable condition on prolonged usage under electrolysis conditions wherein there occurs a vigorous migration of materials. On the other hand, the electroconductivity tends to be lowered with an increase in equivalent weight and such a tendency is conspicuous especially when the membrane is used in highly concentrated alkali solutions, whereby the current efficiency is also lowered. Unexpectedly, according to the present invention, the electroconductivity of the membrane is found to be improved with no substantial lowering in mechanical strength and swelling resistance by blending polymers having different equivalent weights differing by 200 or more. Such a blend prevents an elevation in voltage and a lowering in current efficiency.

Also surprisingly, the membrane prepared from said blend is found to possess better electrochemical properties in highly concentrated alkali solutions than a membrane having an equivalent weight which is equal to the average value of the equivalent weights of the blended polymers.

In the present invention, a first polymer is required to have an equivalent weight in the range from 1350 to 1900, preferably from 1400 to 1600, more preferably from 1450 to 1550; while a second polymer has an equivalent weight in the range from 900 to 1300, preferably from 1000 to 1200, more preferably from 1050 to 1150. These polymers are blended at weight ratios so as to give an average equivalent weight value as defined by the following formula, which is in the range from 1100 to 1600, preferably from 1150 to 1500, and more preferably from 1300 to 1550:

Average equivalent weight = $(EW_1 \times EW_2)/(W_1 \times EW_2 + W_2 \times EW_1)$ wherein $W_1$ and $W_2$ are weight percentages of polymers 1 and 2, respectively; and $EW_1$ and $EW_2$ equivalent weights of polymers 1 and 2, respectively.

For obtaining the favorable results of the present invention, the weight percentage of the polymer with the lower equivalent weight is desirably from 5 to 95%, preferably 10 to 90%, while that of the polymer with the higher equivalent weight is desirably 95 to 5%, preferably 90 to 10%. More preferably, the percentage of the polymer with the higher equivalent weight should be greater than that of the polymer with the lower equivalent weight. The preferable range of the equivalent weight is determined so as to give a well balanced electrochemical performance and physical strength.

In providing the blend as discussed above, it is also possible to use three or more kinds of polymers with different equivalent weights, but two kinds of polymers are preferably used from the standpoint of ease of production.

The cation exchange membrane provided by the present invention contains carboxylic acid groups, sulfonamide groups, N-monosubstituted sulfonamide groups or sulfonic acid groups. According to a preferred embodiment of the invention which is capable of attaining a high current efficiency with low electrolysis voltage, the carboxylic acid groups, sulfonamide groups or N-monosubstituted sulfonamide groups are present in a thin layer with a thickness of 100 Å to 100μ on one side of the membrane, while sulfonic acid groups are present in the residual part of the membrane having a thickness of 25μ to 250μ. More preferably, from the standpoint of electrochemical performance and durable chemical resistance, the carboxylic acid groups and sulfonic acid groups may be present together in the membrane. Particularly, in such a combination, the carboxylic acid groups should preferably be of the formula —$OCF_2CO_2M$ wherein M is hydrogen, a metallic or ammonium ion, and the sulfonic acid groups of the formula —$OCF_2CF_2SO_3M$ wherein M is the same as defined above.

The present membrane may be provided for use as a single film membrane, wherein the equivalent weight is substantially equalized by blending in the direction of thickness. Alternatively, for further improvement of the power consumption, there may also be formed bonded films, wherein a cation exchange membrane of the present invention comprising the blended polymers is made as thin as possible to a thickness of 1μ to 100μ and bonded to another cation exchange membrane containing sulfonic acid groups and having an equivalent weight which is lower by at least 150 than the average equivalent weight of the present membrane. Thus, in this manner, there can be obtained a membrane structure improved in mechanical strength and power consumption. Such a composite membrane may sometimes advantageously be used in electrolysis with the side having the lower equivalent weight facing the anode. In this case, the film thickness for the side with the lower equivalent weight may preferably be at least ½ of the entire membrane thickness.

The present membrane should preferably be reinforced with backing materials such as nets made of inert materials, for example, polytetrafluoroethylene fibers.

The cation exchange membrane of the present invention can be prepared according to the following steps.

First, tetrafluoroethylene is copolymerized with a fluorocarbon vinyl monomer having a sulfonyl fluoride group of the formula (I):

wherein n is an integer of 0 to 3, preferably 1. In the above copolymerization, a small amount of a monomer of the formula:

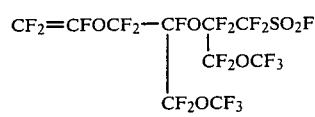

may also be mixed with the above monomers. Furthermore, if necessary, a third monomer of the formula (II) may also be added:

wherein B is Cl, $CF_3$, $OCF_3$ or $OC_3F_7$.

The ratios of the monomers to be copolymerized and the polymerization conditions are so selected that the equivalent weight of the resultant copolymer may fall generally within the range of from 900 to 1900, preferably from 1000 to 1600, more preferably from 1050 to 1550. Moreover, the ratio of the monomeric units in the resultant copolymer is generally from 0 to 0.20, preferably 0 to 0.10, more preferably 0 to 0.05, in terms of the ratio of the vinyl monomer represented by the formula (II) to the sum of the tetrafluoroethylene and the vinyl monomer represented by the formula (II).

The copolymer to be used in the present invention can be prepared by conventional methods for homopolymerization or copolymerization of a fluorinated ethylene. Polymerization may be effected in either an aqueous or nonaqueous system. Generally, the polymerization is performed at temperatures of from 0° to 200° C. under a pressure of 1 to 200 kg/cm². Frequently, the polymerization in the nonaqueous system is carried out in a fluorinated solvent. Examples of suitable nonaqueous solvents are inert solvents including 1,1,2-trichloro-1,2,2-trifluoroethane and perfluorocarbons such as perfluoromethylcyclohexane, perfluorodimethylcyclobutane, perfluorooctane and perfluorobenzene.

The aqueous system polymerization is accomplished by bringing the monomers into contact with an aqueous solvent containing a free radical initiator and a dispersant to produce a slurry of unwettable or granular polymer particles or by bringing the monomers into contact with an aqueous solvent containing both a free radical initiator and a dispersant inert to telomerization to produce a colloidal dispersion of polymer particles, followed by coagulation.

After the polymerization, the powders of two different kinds of copolymers having different equivalent weights are pelletized through an extruder and the resultant pellets are in turn molded by means of an extruder into a membrane. For said molding, there may be employed any well known technique for shaping by way of melt fabrication.

The copolymer, after being shaped into a membrane, can be laminated with a reinforcing material such as nets for improvement of mechanical strength. As the reinforcing material, nets made of polytetrafluoroethylene are most suitable. Porous tetrafluoroethylene sheets are also useful.

In case of the cation exchange membrane having the two bonded films with different equivalent weights as mentioned above, bonding of the films may be effected either before or simultaneously with embedding of the reinforcing material therein. The reinforcing material should preferably be embedded in the film having the lower equivalent weight.

If the thus prepared membrane is then subjected to hydrolysis with an alkali, there can be obtained a cation exchange membrane of the sulfonic acid type. For the purpose of obtaining a cation exchange membrane capable of accomplishing higher current efficiency, however, the surface layer on the side opposite to the side in which the reinforcing material is embedded may preferably be modified to convert the cation exchange groups theren to carboxylic acid groups, sulfonamide groups or N-monosubstituted sulfonamide groups.

Conversion of the surface layer into the carboxylic acid type can be accomplished by first modifying the cation exchange groups in the surface layer or the entire membrane to the groups of the formula: $-OCF_2CF_2SO_2Y$ [wherein Y is halogen, hydroxyl, or $-OZ$ (wherein Z is a metal, ammonium group or quaternary ammonium group) or $-OSO_2CF_2CF_2O-$], preferably sulfonyl halide groups, most preferably sulfonyl chloride groups, followed by treatment of the surface layer with a reducing agent.

As the reducing agents to be used in the present invention, it is possible to use substantially all of the reducing agents known in the art except for the reducing agents forming sulfonamide groups through reaction with sulfonyl halide groups, for example the reducing agents having $-NH_2$ groups such as hydrazine. Typical examples of suitable reducing agents are set forth below.

The reducing agents of the first group are metal hydrides of the generic formula $MeLH_4$ wherein Me represents an alkali metal atom and L an aluminum or boron atom, or $Me'H_x$, wherein Me' represents an alkali metal atom or alkaline earth metal atom and x is an integer with a value of 1 to 2. These include, for example, lithium aluminum hydride, lithium boron hydride, potassium boron hydride, sodium boron hydride, sodium hydride, lithium hydride, potassium hydride, barium hydride and calcium hydride.

The reducing agents of the second group are inorganic acids having reducing activity such as, for example, hydroiodic acid, hydrobromic acid, hypophosphorous acid, hydrogen sulfide water, arseneous acid, phosphorous acid, sulfurous acid, nitrous acid, formic acid and oxalic acid.

The reducing agents of the third group are mixtures of metals and acids. Examples of these metals include tin, iron, zinc and zinc amalgam and those of acids include hydrochloric acid, sulfuric acid, acetic acid, phosphoric acid, formic acid, trifluoromethanesulfonic acid, trifluoroacetic acid and trichloroacetic acid.

The reducing agents of the fourth group are compounds of low-valency metals. Examples of these compounds include stannous chloride, ferrous sulfate, titanium trichloride, ferrous chloride, stannous sulfate, ferrous sulfide, stannous sulfide, ferrous bromide, stannous bromide and ferrous hydroxide. They may be used in conjunction with such acids as hydrochloric acid and sulfuric acid.

The reducing agents of the fifth group are organic metal compounds. Examples of these reducing agents include butyl lithium, Grignard reagent (e.g. $C_{1-8}$ alkyl- or aryl-magnesium halide), triethyl aluminum, tri-isobutyl aluminum, sodium-benzene and sodium-naphthalene.

The reducing agents of the sixth group are inorganic acid salts possessing reducing activity and similar compounds. Examples of these reducing agents include iodides such as lithium iodide, sodium iodide, calcium iodide, barium iodide, ammonium iodide, tetramethylammonium iodide, tetraethylammonium iodide, tetrapropylammonium iodide and tetrabutylammonium iodide; bromides such as lithium bromide, sodium bromide, potassium bromide, calcium bromide, barium bromide, ammonium bromide, tetramethylammonium bromide, tetraethylammonium bromide, tetrapropylammonium bromide and tetrabutylammonium bromide; sulfides such as potassium sulfide, sodium sulfide, ammonium sulfide, sodium polysulfide and phosphorus trisulfide; phosphites such as lithium phosphite, sodium phosphite, potassium phosphite, calcium phosphite, barium phosphite and ammonium phosphite; sulfites such as lithium sulfite, sodium sulfite, potassium sulfite, barium sulfite and ammonium sulfite; arsenites such as lithium arsenite, sodium arsenite, potassium arsenite, calcium arsenite, barium arsenite and ammonium arsenite; dithionites such as lithium dithionite, sodium dithionite, potassium dithionite, calcium dithionite, barium dithionite and ammonium dithionite; nitrites such as lithium nitrite, sodium nitrite, potassium nitrite, calcium nitrite, barium nitrite and ammonium nitrite; and formates such as lithium formate, sodium formate and ammonium formate.

The reducing agents of the seventh group are mixtures of metals with water, steam, alcohols or alkalis. Examples of metals usable in such mixtures include sodium, lithium, aluminum, magnesium, zinc, iron and amalgams thereof. Examples of alkalis include alkali hydroxides and alcoholic alkalis.

The reducing agents of the eighth group are organic compounds possessing a reducing activity such as triethanolamine, acetaldehyde, propylaldehyde, benzaldehyde, hydroquinone and naphthoquinone.

The reducing agents of the ninth group are gases possessing a reducing activity such as hydrogen iodide, hydrogen bromide, hydrogen sulfide, sulfur dioxide and carbon monooxide.

From the standpoint of the reaction rate and ease of handling, the reducing agents belonging to the second, third, fourth, sixth and ninth groups are found to be preferable. The reducing agents belonging to the second, sixth and ninth groups are particularly preferred.

The optimum conditions for treatment with a reducing agent are selected depending on the particular reducing agent to be used and on the kind of the substituent Y in the $-SO_2Y$ group. Generally, the reaction temperature is in the range of from $-50°$ C. to $250°$ C., preferably from $0°$ to $150°$ C., and the reducing agent is used in the form of a gas, liquid or solution. As the solvents, there can be used water; polar organic solvents such as methanol, tetrahydrofuran, diglyme, acetonitrile, propionitrile, and benzonitrile; non-polar organic solvents such as n-hexane, benzene and cyclohexane; or mixtures of such solvents.

The amount of the reducing agent is not less than the equivalent of the substituents present in the surface layer to be treated. Preferably, the reducing agent is used in large excess. The pH value of the reaction system is selected on the basis of the particular reducing agent employed and may be maintained in an acidic, neutral or alkaline region as the occasion demands. The reaction can be carried out under reduced, normal or increased pressure. In the reaction involving the use of a gaseous reducing agent, the increased pressure can improve the velocity of the reaction. The reaction time is generally in the range from one minute to 100 hours.

Treatment with the reducing agent is applied preferably only on one surface of the membrane and, in case of a membrane comprising two bonded films with different equivalent weights, generally on the side having the greater equivalent weight.

The reaction which occurs during the above treatment is a consecutive reaction in which carboxylic acid groups are formed via sulfinic acid groups. The sulfinic acid groups formed by treatment with the reducing agent can be detected in the Na form from the infra-red absorption spectrum at 940 cm$^{-1}$ and 1010 cm$^{-1}$. The layer carrying the formed sulfinic acid groups is readily discernible by a staining technique. For example, when sulfonyl halide groups are treated with the reducing agent, a cross-section cut from the membrane is stained by immersion in an aqueous crystal violet solution containing 5 to 10% ethanol for several minutes and thereafter observed by a microscope. It is also possible to determine the thickness of the treated layer and the conversion therein by measurement of the elements distributed on a cross-section of the membrane by means of a X-ray microprobe analyzer.

As to the further progress of the reaction as carboxylic acid groups are formed, the infra-red absorption of the sulfinic acid groups in the Na form at 940 cm$^{-1}$ and 1010 cm$^{-1}$ becomes attenuated and the infra-red absorption appears at 1690 cm$^{-1}$ in the H form and at 1780 cm$^{-1}$ in the Na form.

The products of the treatment with a reducing agent may take three typical forms. They are:

(a) Substantially all of the products are carboxylic acid groups.

(b) Carboxylic acid groups and sulfinic acid groups are formed in substantially equal amounts.

(c) Substantially all of the products are sulfinic acid groups.

In the case of (b) and (c) as mentioned above, further treatment with a stronger reducing agent or under stronger reducing conditions will bring about conversion to substantially only carboxylic acid groups. Also in the case of (b) and (c), sulfinic acid groups can be converted to carboxylic acid groups by a heating treatment. Such heating treatment may be performed in any desired atmosphere at $60°$ to $400°$ C., preferably from $100°$ to $200°$ C., for 15 minutes or longer, preferably 30 minutes or longer.

When sulfinic acid groups remain in minute amounts, they may be converted to sulfonic acid groups, if desired. Conversion to sulfonic acid groups can readily be carried out by an oxidation treatment in an aqueous 1–5% NaClO solution or an aqueous 1–30% $H_2O_2$ solution at $40°$ to $90°$ C. for 2 to 20 hours. Unaltered $-OCF_2CF_2SO_2Y$ groups (Y being the same as defined above) are treated with an alkali for conversion to sulfonic acid groups, before the membrane is employed in electrolysis.

For conversion of the cation exchange groups in the surface layer on one side of the membrane to the sulfonamide group type or the N-monosubstituted sulfonamide type, the groups contained in the surface layer or in the entire membrane are converted first to sulfonyl halide groups, preferably sulfonyl fluoride groups, and the surface layer is then treated with an amine of the formula $R_1NH_2$ or the formula $H_2NR_2NH_2$, wherein $R_1$ is hydrogen, an alkyl having 1 to 6 carbon atoms, cyclohexyl or an aryl and $R_2$ is $-C_mH_{2m+2}$ (wherein m is an integer of 1 to 6),

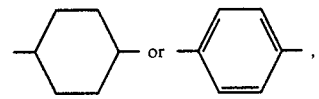

at a reaction temperature in the range from $-40°$ C. to $200°$ C., preferably from $0°$ to $100°$ C. In this reaction, said amine may be used in the form of a gas, a liquid or a solution in a conventionally used organic solvent. When the amine is gaseous, it may be diluted with an inert gas such as nitrogen, helium, air, etc. for the reaction.

After the reaction, the membrane is treated with an alkali in order to convert residual exchange groups to the sulfonic acid type before being provided for use in electrolysis.

When the present membrane is used in the electrolysis of an aqueous alkali metal halide, it is preferred that the layer in which the carboxylic acid groups, sulfonamide groups or N-monosubstituted sulfonamide groups are present face toward the cathode side in order to obtain better results.

Electrolysis may be performed by use of the present membrane under the conditions of a current density of 10 to 70 A/dm$^2$, a temperature of $20°$ to $100°$ C., a concentration of alkali metal halide of from 1 to 5 N and an alkali concentration of from 1 to 20 N.

The present membrane can be used in an alkali with a higher concentration to exhibit an improved current efficiency and a stable low voltage as compared with those known in the art, thus giving a great economical advantage.

The present invention is described in further detail by reference to the following Examples which are merely illustrative and by which the present invention is not to be limited.

EXAMPLE 1

Tetrafluoroethylene and perfluoro-3,6-dioxa-4-methyl-7-octenesulfonyl fluoride are copolymerized in 1,1,2-trichloro-1,2,2-trifluoroethane, using perfluoropropionyl peroxide as initiator, while maintaining the polymerization temperature at 45° C. and the pressure at 6 kg/cm$^2$G. The resultant copolymer is designated as Polymer 1.

Another copolymer is also prepared according to a similar procedure while maintaining the pressure at 3 kg/cm$^2$G. This copolymer is designated as Polymer 2.

A part of each of these polymers is subjected to hydrolysis treatment with a mixed solution (volume ratio = 1:1) of a 5 N aqueous caustic soda solution and methanol at 90° C. for 16 hours to convert the sulfonyl fluoride groups to sulfonic acid groups (Na form). Polymer 1 is found to have a cation exchange capacity of 0.67 milliequivalent/g-dry resin and Polymer 2 a cation exchange capacity of 0.91 milliequivalent/g-dry resin, which capacity values as expressed by equivalent weights are 1500 and 1100, respectively.

Polymer 1 and Polymer 2 are blended to prepare a copolymer composition having an average equivalent weight of 1350, which is designated as Polymer 3. Polymer 3 and Polymer 2 are shaped by melt fabrication into films of 50μ and 100μ in thickness, respectively. Both films are bonded to each other by heat sealing to prepare a composite membrane.

This membrane is saponified in 2.5 N caustic soda/50% methanol at 60° C. for 16 hours and returned to the H form in 1 N hydrochloric acid. Then, the membrane is heated under reflux in phosphorus pentachloride/phosphorus oxychloride (1:1) at 120° C. for 20 hours to convert the sulfonic acid groups to the sulfonyl chloride type. After the reaction, the membrane is washed with carbon tetrachloride and then subjected to measurement of an attenuated total reflection spectrum (hereinafter referred to as ATR), which shows a strong characteristic absorption band at 1420 cm$^{-1}$ of sulfonyl chloride. In a crystal violet solution the membrane is not stained. Between frames made of acrylic resin, two sheets of this membrane are fastened in position by means of packings made of polytetrafluoroethylene, with the sides of Polymer 3 being on the outside.

This frame is immersed in an aqueous 57 percent hydroiodic acid solution so that only the sides of Polymer 3 may undergo reaction at 80° C. for 24 hours. After the reaction, the cross-sections of these membranes are subjected to staining by Malachite Green, which is adjusted at pH=1. Each membrane is found to be stained to a pale blue color at the layer which is 15μ in depth from the surface on the side of Polymer 3.

This membrane is immersed in 2.5 N caustic soda/50% aqueous methanol solution at 60° C. for 16 hours and further in an aqueous 5% sodium hypochlorite solution at 90° C. for 16 hours. Then, the cross-section of this membrane is stained again by Malachite Green of pH=1, whereby the layer having a depth of 8μ from the side of Polymer 3 is observed to be stained to a pale blue color, indicating the formation of carboxylic acid groups. The residual part is stained yellow, indicating conversion to sulfonic acid groups.

This membrane is found to have a specific conductivity of 6.2×10$^{-3}$ mho/cm in an aqueous 0.1 N caustic soda solution.

The specific conductivity of the membrane is determined by initial conversion to a complete Na form, keeping the membrane in a constantly renewed bath of an aqueous 0.1 N caustic soda solution at room temperature for ten hours until equilibrium and subjecting it to an alternating current of 1000 cycles while under an aqueous 0.1 N caustic soda solution at 25° C. for measurement of the electric resistance of the membrane.

The thus prepared electrolysis diaphragm in the Na form is equilibrated in an aqueous 1 N caustic soda solution at 90° C. for 16 hours and assembled in an electrolytic cell in such a manner that the treated surface falls on the cathode side. It is utilized as the membrane in the electrolysis of sodium chloride. Its current efficiency is measured to be 95% with a voltage of 3.8 V.

The electrolytic cell has a service area of 15 cm$^2$ (5 cm×3 cm) and comprises an anode compartment and a cathode compartment separated by the electrolytic diaphragm. A metallic, dimensionally stable anode is employed therein and an iron plate is used as the cathode. An aqueous 3 N sodium chloride solution at pH 2 is circulated through the anode compartment and an aqueous 40% caustic soda solution through the cathode compartment at 90° C. Under these conditions, an electric current is passed between the electrodes at a current density of 40 amperes/dm$^2$. The current efficiency is calculated by dividing the amount of caustic soda produced in the cathode compartment per hour by the theoretical value calculated from the amount of electricity passed.

COMPARISON EXAMPLE 1

Polymer 1 as prepared in Example 1 is shaped into a film. Using this film in place of the film of Polymer 3, the procedures of Example 1 are repeated. The performances of the resultant diaphragm are measured under the same conditions as in Example 1 to be 4.1×10$^{-3}$ mho/cm for specific conductivity, 90% for current efficiency and 4.4 V for voltage.

COMPARISON EXAMPLE 2

A copolymer having an equivalent weight of 1350 is prepared by changing the polymerization conditions as described in Example 1. This copolymer is shaped into a film, and the procedures of Example 1 are repeated using this film. The performances of the resultant diaphragm are measured under the same conditions as in Example 1 to be 5.2×10$^{-3}$ mho/cm for specific conductivity, 94% for current efficiency and 4.0 V for voltage.

EXAMPLE 2

By changing the weight ratios in the blending of Polymer 1 and Polymer 2 as prepared in Example 1, there is obtained a copolymer composition having an average equivalent weight of 1420. This composition is made into a film and used in place of the film of Polymer 3. The diaphragm prepared under otherwise the same conditions as described in Example 1 is measured similarly as in Example 1 to have a specific conductivity of 5.5×10$^{-3}$ mho/cm, a current efficiency of 97% and a voltage of 3.9 V.

COMPARISON EXAMPLE 3

A copolymer having an equivalent weight of 1420 is prepared by changing the polymerization conditions as described in Example 1. This copolymer is shaped into a film and the procedures of Example 1 are repeated using this film in place of the film of Polymer 3. The resultant diaphragm, as measured under the same conditions as in Example 1, is found to have a specific conductivity of $4.5 \times 10^{-3}$ mho/cm, a current efficiency of 91% and a voltage of 4.2 V.

EXAMPLE 3

The one surface of the bonded films as prepared in Example 1 on the side of Polymer 3 is subjected to hydrolysis to a depth of 20$\mu$ using 2.5 N caustic soda/aqueous 50% methanol solution. This membrane, with the non-hydrolyzed surface downward, is superposed on a fabric made of polytetrafluoroethylene, which is a plain weave fabric having 40 multi-filaments of 400 denier both in warp and weft and 0.15 mm in thickness, and the fabric is embedded in the membrane by heating to 270° C. while subjecting the membrane to evacuation.

In the same manner as described in Example 1, this membrane is modified to the sulfonyl chloride type. Using a frame made of acrylic resin, two sheets of this membrane are juxtaposed and fastened in position in this frame, with the surfaces having the fabrics embedded therein being on the innerside. This frame is immersed in an aqueous 47% hydrobromic acid solution to carry out the reaction at 85° C. for 30 hours. After the reaction, the membrane is taken out and hydrolyzed in 2.5 N caustic soda/aqueous 50% methanol solution, followed additionally by oxidative treatment in 2.5 N caustic soda/2.5% sodium hypochlorite at 90° C. for 16 hours. The specific conductivity and the electrolytic characteristics are measured under the same conditions as described in Example 1 to be $10^{-3}$ mho/cm, 4.0 V(voltage) and 95% (current efficiency), respectively. These performances are also measured after current passage for 8000 hours to observe that there is no substantial change from the initial values.

EXAMPLE 4

According to a process similar to Example 1, polymers having an equivalent weight of 1100 and 1400, respectively, are prepared. These polymers are blended to obtain a copolymer composition having an average equivalent weight of 1200, which composition is in turn made into a film of 125$\mu$ in thickness by heat molding.

This film is allowed to react on its one surface to the depth of 25$\mu$ with ethylenediamine at room temperature to form N-alkyl sulfonamide groups. After washing with water, the film is subjected to hydrolysis in 2 N caustic potash/50% dimethylsulfoxide. The resultant diaphragm is found to have a current efficiency of 92% and a voltage of 4.2 V when measured under the same conditions as in Example 1.

COMPARISON EXAMPLE 4

Example 4 is repeated except that a polymer having 1200 of equivalent weight is prepared by controlling the polymerization conditions. The membrane prepared from this polymer according to the procedures similar to Example 1 is found to have a current efficiency of 90% and a voltage of 4.5 V.

EXAMPLE 5

When Example 4 is repeated by using n-butylamine in place of ethylenediamine, there is obtained a similar result.

COMPARISON EXAMPLE 5

The sulfonyl fluoride type membrane as prepared in Comparison example 2 is hydrolyzed in 2.5 N caustic soda/50% methanol. The resultant sulfonic acid type membrane is subjected to measurement under the same conditions as in Example 1. The specific conductivity, the current efficiency and the voltage are found to be $7.5 \times 10^{-3}$ mho/cm, 68% and 3.6 V, respectively.

The invention being thus described, it will be obvious that the same may be varied in many ways. Such variations are not regarded as a departure from the spirit and scope of the invention, and all such modifications are intended to be included within the scope of the following claims.

What we claim is:

1. A fluorocarbon type cation exchange membrane consisting essentially of fluorinated polymers having sulfonic acid groups as side chains or as a part of the side chains bonded to the backbone of the fluorinated polymers and also including at least one other cation exchange group therein which is selected from the group consisting of carboxylic acid groups, sulfonamide groups and N-monosubstituted sulfonamide groups, and having an average equivalent weight in the range of from 1100 to 1600, said fluorinated polymers being prepared by blending homogeneously the following two different fluorinated polymers containing sulfonyl fluoride groups and having different cation exchange capacities on the basis of equivalent weight, so that the average equivalent weight is in the range of from 1100 to 1600:
   (1) a first sulfonyl fluoride group-containing fluorinated polymer having an equivalent weight of from 1350 to 1900 in terms of sulfonic acid groups converted therein, and
   (2) a second sulfonyl fluoride group-containing fluorinated polymer having an equivalent weight which is in the range of from 900 to 1300 in terms of sulfonic acid groups converted therein and which is smaller by at least 200 than that of said first fluorinated polymer, shaping the polymer blend into a film, subjecting at least a surface of the film to a chemical treatment so as to convert the sulfonyl fluoride groups present at the surface of the film into carboxylic acid groups, sulfonamide groups or N-monosubstituted sulfonamide groups, and hydrolyzing the unaltered sulfonyl fluoride groups to convert them into sulfonic acid groups.

2. A cation exchange membrane according to claim 1, wherein the carboxylic acid groups are of the formula: —$OCF_2CO_2M$ wherein M is hydrogen, a metallic or ammonium ion and the sulfonic acid groups are of the formula —$OCF_2CF_2SO_3M$ wherein M is the same as defined above.

3. A cation exchange membrane according to claim 1, which is reinforced with a backing material.

4. A cation exchange membrane according to claim 1, wherein the cation exchange groups in the membrane are carboxylic acid groups and sulfonic acid groups.

5. A fluorocarbon type cation exchange membrane, consisting essentially of (a) a cation exchange membrane as defined in claim 1 and (b) another fluorocarbon type cation exchange membrane which is bonded to said membrane (a), the membrane (b) containing sulfonic acid groups as cation exchange groups and having an equivalent weight which is smaller by 150 or more than the average equivalent weight of the fluorinated polymer composition in membrane (a).

6. A cation exchange membrane according to claim 5, wherein the carboxylic acid groups, sulfonamide groups or N-monosubstituted sulfonamide groups are present in a surface stratum on one side of the membrane (a) opposite to the side of the membrane (b), and the sulfonic acid groups are contained in the residual part of membrane (a).

7. A cation exchange membrane according to claim 6, wherein the cation exchange groups in membrane (a) are carboxylic acid groups and sulfonic acid groups.

8. A cation exchange membrane according to claim 7, wherein the carboxylic acid groups are of the formula: $-OCF_2CO_2M$ wherein M is hydrogen, a metallic or ammonium ion and the sulfonic acid groups are of the formula: $-OCF_2CF_2SO_3M$ wherein M is the same as defined above.

9. A cation exchange membrane according to claim 8, which is reinforced with a backing material.

* * * * *

UNITED STATES PATENT AND TRADEMARK OFFICE
CERTIFICATE OF CORRECTION

PATENT NO. : 4,414,338
DATED : November 8, 1983
INVENTOR(S) : Kyoji KIMOTO et al It is certified that error appears in the above-identified patent and that said Letters Patent are hereby corrected as shown below:

In the Heading of the Patent, after the category

"Related U.S. Application Data", insert

--[30] Foreign Application Priority Data

Jul. 11, 1978 [JP] Japan..............53-84246--

Signed and Sealed this

Nineteenth Day of February 1985

[SEAL]

Attest:

DONALD J. QUIGG

Attesting Officer     Acting Commissioner of Patents and Trademarks